United States Patent
Zeng (10) Patent No.: US 10,403,216 B2
(45) Date of Patent: Sep. 3, 2019

(54) METHOD FOR REDUCING ELECTROMAGNETIC INTERFERENCE OF LCD DATA SIGNAL

(71) Applicant: Shenzhen China Star Optoelectronics Technology Co., Ltd., Shenzhen, Guangdong (CN)

(72) Inventor: Dekang Zeng, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/500,227

(22) PCT Filed: Jan. 20, 2017

(86) PCT No.: PCT/CN2017/071895
§ 371 (c)(1),
(2) Date: Jan. 25, 2018

(87) PCT Pub. No.: WO2018/040496
PCT Pub. Date: Mar. 8, 2018

(65) Prior Publication Data
US 2018/0218692 A1    Aug. 2, 2018

(30) Foreign Application Priority Data

Aug. 30, 2016  (CN) .......................... 2016 1 0767553

(51) Int. Cl.
G09G 3/36       (2006.01)
G02F 1/133      (2006.01)
G09G 5/18       (2006.01)

(52) U.S. Cl.
CPC ........... G09G 3/36 (2013.01); G02F 1/13306 (2013.01); G09G 5/18 (2013.01); G09G 2330/06 (2013.01); G09G 2340/0435 (2013.01)

(58) Field of Classification Search
CPC ........ G09G 3/36; G09G 2330/06; G09G 5/00; G02F 1/13306
See application file for complete search history.

(56) References Cited

U.S. PATENT DOCUMENTS 4,901,351 A    2/1990  Tanaka et al.
6,611,247 B1 * 8/2003  Chang .................... G09G 5/006
                                                  345/100

FOREIGN PATENT DOCUMENTS

CN    1283286 A    2/2001
CN    1343407 A    4/2002
(Continued)

OTHER PUBLICATIONS

International Search Report and Written Opinion for International Application No. PCT/CN2017/071895, dated Jun. 5, 2017.
(Continued)

Primary Examiner — Charles V Hicks (57) ABSTRACT

Disclosed is a method for reducing electromagnetic interference of LCD data signal. The method, while ensuring that decoding frequency bandwidth of a receiving terminal of a timer control register remains unchanged, correctly decodes high-speed transmission signals which use a spread spectrum function, which can effectively reduce electromagnetic interference, avoid noise, quickly and correctly decode high-speed transmission signals which use a spread spectrum function, and enable an image to be displayed normally.

6 Claims, 5 Drawing Sheets

(56) References Cited

FOREIGN PATENT DOCUMENTS

| | | |
|---|---|---|
| CN | 1504988 A | 6/2004 |
| CN | 1599246 A | 3/2005 |
| CN | 102006099 A | 4/2011 |
| CN | 102298916 A | 12/2011 |
| CN | 103051332 A | 4/2013 |
| CN | 203276789 U | 11/2013 |
| CN | 105845095 A | 8/2016 |
| CN | 106205535 A | 12/2016 |
| JP | 2001007782 A | 1/2001 |
| JP | 2002314517 A | 10/2002 |

OTHER PUBLICATIONS

Chinese Office Action and Search Report for Chinese Patent Application No. 201610767553.9 dated Jul. 20, 2018.

\* cited by examiner

METHOD FOR REDUCING ELECTROMAGNETIC INTERFERENCE OF LCD DATA SIGNAL

CROSS-REFERENCE TO RELATED APPLICATIONS

The present application claims the priority of Chinese patent application CN 201610767553.9, entitled "Method for reducing electromagnetic interference of LCD data signal" and filed on Aug. 30, 2016, the entirety of which is incorporated herein by reference.

FIELD OF THE INVENTION

The present disclosure relates to the technical field of spread spectrum decoding, and in particular, to a method for reducing electromagnetic interference of LCD (Liquid Crystal Display) data signal.

BACKGROUND OF THE INVENTION

During the transmission of high-speed signals, energy reflection of high-speed signals causes EMI (Electromagnetic Interference), i.e., electronic noise which interferes cable signals and damages signal integrity. EMI is usually caused by a source of electromagnetic radiation, such as a motor or a machine. EMI can be classified into two types, i.e., conduction interference and radiation interference. The radiation interference needs to be reduced in the technical field of spread spectrum decoding of a display device. Radiation inference means that an interference source couples a signal thereof to another electrical network through space. If radiant energy is too high, it will cause damages to human body. In the TFT-LCD (Thin Film Transistor Liquid Crystal Display) industry, data signal transmission and high-speed signal transmission also have the risk of EMI. Thus, reducing EMI is a burning technical problem to be solved.

In the prior art, spread spectrum technology is a commonly-used wireless communication technology. When a clock generator on a mainboard works, pulse peaks will cause EMI which can be reduced by spread spectrum technology.

Figure 1:
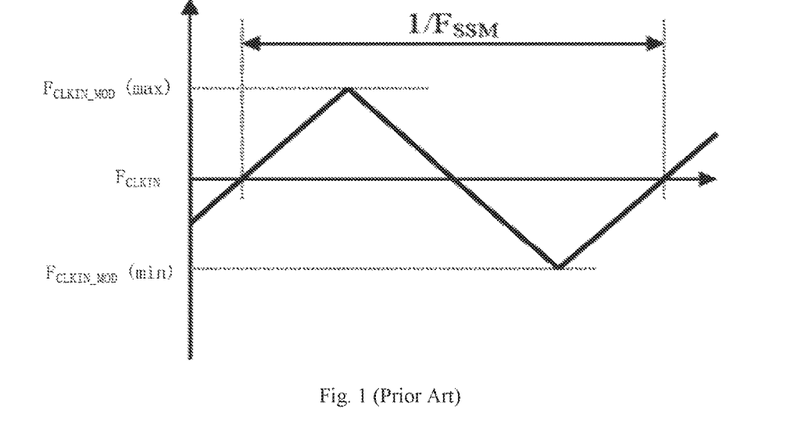
FIG. 1 schematically shows a spread spectrum wave form mentioned in the Background of the Invention, wherein $F_{CLKON\_MOD(max)}$ stands for a maximum value of crystal oscillator frequency and $F_{CLKON\_MOD(min)}$ stands for a minimum value of crystal oscillator frequency.

Spread spectrum function periodically modulates and demodulates crystal oscillator frequency of a fixed input signal frequency of high-speed signals (Fclkin). Spread spectrum wave form is shown in FIG. 1. TFT-LCD data signal are all high-speed signals. LVDS, V-by-One, mini-LVDS, and USI-T are all common TFT-LCD data signals.

Spread spectrum function of LVDS (Low-Voltage Differential Signaling) is taken as an example below for illustration.

In an electric furnace, LVDS is configured to transform a serial signal into a parallel signal of a TTL (Transistor-Transistor Logic) level signal, and send the parallel signal to a LCD screen for sequential control and to form a row driving signal and a column driving signal. A LVDS signal is a low-swing differential digital signal which appears in pairs. A LVDS circuit transforms a TTL digital signal, a clock signal, a horizontal synchronous signal, and a vertical synchronous signal into LVDS signals through coding, drives a current source through a differential line, and sends the LVDS signals into a differential receptor of a TCON (Time Control Register). Upon receipt of the LVDS signals, the TCON decodes them.

Normally, LVDS signals used in a TFT-LCD have a fixed input signal frequency of 75 MHz. A maximum floating range (variation range) of the input signal frequency is ±2%, while the spread spectrum has a variation frequency of 200 KHz, i.e. varying in a range of 73.5 MHz to 76.5 MHz.

The input signal frequency changes in a regular pattern, i.e. the input signal frequency gradually increases from 73.5 MHz to 76.5 MHz and then gradually decreases from 76.5 MHz to 73.5 MHz. The foregoing process is repeated again and again. A frequency change speed shall not have a cycle above 200 KHz.

The above method effectively reduces EMI. However, it makes decoding work of the TCON after receipt of a signal become difficult, which causes risks of signal decoding error and display noise and eventually affects image quality.

SUMMARY OF THE INVENTION

Regarding the problems existed in the prior art, the present disclosure provides a method for reducing EMI of LCD data signal.

The existing EMI-reducing method can lead to signal decoding error and display noise. To solve the above problem, the present disclosure provides a method for reducing EMI of LCD data signal.

The present disclosure provides four decoding methods for reducing EMI which are listed below.

The first decoding method which can reduce EMI and improve spread spectrum decoding accuracy comprises steps of:

step 1: dividing a frequency variation cycle of each signal during spread spectrum modulation into N sections;

step 2: measuring signal frequency values in M random clock cycles of each section, evaluating an average value of the signal frequency values in M random clock cycles, and evaluating a difference between the average value and a current decoding frequency value a to obtain a difference value d;

step 3: dividing the difference value d by a set tracking frequency value b to obtain a ratio k, and making a comparison between the ratio k and bp % and between the ratio k and bq %, p %>q %:

if k>bp %, a new decoding frequency value $a_1$ is obtained, $a_1=a+2b$, and then a decoding is performed by taking advantage of the new decoding frequency value $a_1$;

if k<bq %, a new decoding frequency value $a_2$ is obtained, $a_2=a-2b$, and then a decoding is performed by taking advantage of the new decoding frequency value $a_2$; and if bq %≤k≤bp %, step 4 is performed; and step 4: making a comparison between the ratio k and bp %, between the ratio k and bq %, between the ratio k and br %, and between the ratio k and bs %:

if bs %<k≤bp %, a new decoding frequency value $a_3$ is obtained, $a_3=a+b$, and then a decoding is performed by taking advantage of the new decoding frequency value $a_3$;

if bq %≤k<br %, a new decoding frequency value $a_4$ is obtained, $a_4=a-b$, and then a decoding is performed by taking advantage of the new decoding frequency value $a_4$; and if br %≤k≤bs %, the decoding frequency value is still a, and then a decoding is performed by taking advantage of the decoding frequency value a.

The foregoing p %, q %, r %, and s % each stand for a set frequency variation rate and q %<s %<r %<p %.

In step 1 of the above method for reducing EMI of LCD data signal, each cycle is 1/Fssm.

In the above method for reducing EMI of LCD data signal, after a decoding is performed by taking advantage of the new decoding frequency value, steps 2-4 are repeated to obtain a next new decoding frequency value.

The second decoding method which can reduce EMI and improve spread spectrum decoding accuracy comprises steps of:

step 1: dividing a frequency variation cycle of each signal during spread spectrum modulation into N sections; and step 2: measuring signal frequency values in M successive clock cycles of each section, evaluating an average value of the signal frequency values in M successive clock cycles, and performing a decoding by taking the average value as a new decoding frequency value.

In step 1 of the above method for reducing EMI of LCD data signal, each cycle is 1/Fssm.

In the above method for reducing EMI of LCD data signal, after a decoding is performed by taking advantage of the new decoding frequency value, step 2 is repeated to obtain a next new decoding frequency value.

The third decoding method which can reduce EMI and improve spread spectrum decoding accuracy comprises steps of:

step 1: dividing a frequency variation cycle of each signal during spread spectrum modulation into N sections;

step 2: measuring signal frequency values in M random clock cycles of each section, evaluating an average value of the signal frequency values in M random clock cycles, and evaluating a difference between the average value and a current decoding frequency value a to obtain a difference value d;

step 3: dividing the difference value d by one-step frequency variation value to obtain a ratio k, and making a comparison between the ratio k and bp % and between the ratio k and bq %:

if k>bp %, a new decoding frequency value at is obtained, $a_1=a+b$, and then a decoding is performed by taking advantage of the new decoding frequency value $a_1$;

if k<bq %, a new decoding frequency value $a_2$ is obtained, $a_2=a-b$, and then a decoding is performed by taking advantage of the new decoding frequency value $a_2$; and if bq %≤k≤bp %, the decoding frequency value is still a, and then a decoding is performed by taking advantage of the decoding frequency value a.

The foregoing p % and q % each stand for a set frequency variation rate and p %>q %.

In step 1 of the above method for reducing EMI of LCD data signal, each cycle is 1/Fssm.

In the above method for reducing EMI of LCD data signal, after a decoding is performed by taking advantage of the new decoding frequency value, step 2 and step 3 are repeated to obtain a next new decoding frequency value.

The fourth decoding method which can reduce EMI and improve spread spectrum decoding accuracy comprises steps of:

step 1: dividing a frequency variation cycle of each signal during spread spectrum modulation into N sections;

step 2: measuring all signal frequency values of each section, making a comparison between all the signal frequency values and a current decoding frequency value, and recording comparison results; and step 3: in the foregoing comparison results:

if x % of the signal frequency values are larger than the current decoding frequency value, a new decoding frequency value at is obtained, $a_1=a+b$, and then a decoding is performed by taking advantage of the new decoding frequency value $a_1$;

if x % of the signal frequency values are smaller than the current decoding frequency value, a new decoding frequency value $a_2$ is obtained, $a_2=a-b$, and then a decoding is performed by taking advantage of the new decoding frequency value $a_2$; and if x % of the signal frequency values are equal to the current decoding frequency value, a decoding is performed by taking advantage of the current decoding frequency value.

The foregoing x % stands for a set distribution rate of signal frequency values.

In step 1 of the above method for reducing EMI of LCD data signal, each cycle is 1/Fssm.

In the above method for reducing EMI of LCD data signal, after a decoding is performed by taking advantage of the new decoding frequency value, step 2 and step 3 are repeated to obtain a next new decoding frequency value.

The decoding methods provided in the present disclosure can reduce EMI and improve spread spectrum decoding accuracy. While ensuring that decoding frequency bandwidth of a receiving terminal of a TCON remains unchanged, these methods correctly decode high-speed transmission signals which use a spread spectrum function, which can effectively reduce EMI, avoid noise, quickly and correctly decode high-speed transmission signals which use a spread spectrum function, and enable an image to be displayed normally.

The method for reducing EMI of LCD data signal provided in the present disclosure is applicable to decoding of a LCD panel or a LED (Light-Emitting Diode) display panel. Through this method, a normal decoding is realized, EMI is reduced, noise is avoided, and a high image quality is obtained.

The above technical features can be combined in any suitable manner, or substituted by the equivalent technical features, as long as the purpose of the present disclosure can be achieved.

BRIEF DESCRIPTION OF THE DRAWINGS

In the drawings, the same components are represented by the same reference signs, and the figures are not drawn to scale.

DETAILED DESCRIPTION OF THE EMBODIMENTS

The present disclosure will be illustrated further hereinafter with reference to the drawings.

In the prior art, an interference source, a transmission route, and an interfered device are three elements that cause EMI. Thus, EMI suppression shall be focused on the three elements. First, the interference source shall be restrained, so as to directly eliminate the cause of interference. Second, coupling and radiation between the interference source and the interfered device shall be eliminated, so as to cut off the transmission route of EMI. Third, anti-interference ability of the interfered device shall be improved, so as to reduce sensitivity of the interfered device to noise. At present, interference is mainly suppressed by cutting off a coupling route between an EMI source and an interfered device. Commonly-used methods include shielding, ground connection, and filtering, which are indeed effective. However, few has tried to directly control an interference source to eliminate interference, or improve anti-interference ability of an interfered device, due to which the interference source constantly interferes other devices. Under these circumstances, eliminating interference wastes plenty of resources.

A PDP (Plasma Display Panel) control board has been developed to be a high-speed digital circuit board. If a control board is not well designed, serious EMI problems will be caused, which makes a system unable to work normally and a product unable to pass an EMI test. Thus, an EMC (Electronic Magnetic Compatibility) design of a control board is particularly important. An active clock circuit on the control board which works periodically is the interference source. The design of the active clock circuit determines success or failure of an EMC design of a control board. Parasitic parameters of elements and components, an imperfect design of a clock circuit schematic diagram, strong interference of a PCB (Printed Circuit Board) near field, and inappropriate installation and placement of components on the PCB can all cause EMI. Besides, circuits on the PCB are usually arranged manually, which is casual and can lead to EMI.

Regarding the problem mentioned in related technologies that an interference source constantly interferes other devices, no effective solution has been provided yet.

Chinese patent application CN 201110124331.2, entitled "Control method and apparatus for electromagnetic interference", provides a control method for EMI. The method comprises steps of: adding at least one spread spectrum chip to a clock output terminal of an oscillator; spreading working frequency of a clock circuit of the oscillator by means of at least one spread spectrum chip; after the foregoing spreading procedures, confirming the clock circuit of the oscillator as an interference source; and cutting off a coupling route between the interference source and an interfered device.

According to the above method, a spread spectrum chip is added for spreading spectrum, so as to reduce EMI. By way of this, the above method reduces EMI from the interference source.

New thinking is provided in the present disclosure. The present disclosure provides a method for reducing EMI of LCD data signal which can not only reduce EMI but also improve spread spectrum decoding accuracy. This method, without adding a chip, uses an original structure for self-adaptive spread spectrum, through a SOC (System On Chip) signal at a measuring back-end, which reduces EMI, improves spread spectrum decoding accuracy, reduces difficulties of decoding work of the TCON, stabilizes image quality, and ensures a simple structure.

With reference to drawings of the description, technical solutions of embodiments in the present disclosure are clearly and fully illustrated. The embodiments are solutions when the present disclosure is applied in practice and are not all feasible solutions. Other embodiments obtained by those skilled in the art without the exercise of inventive faculty, all fall into the protection scope of the present disclosure.

The present disclosure will be illustrated below in detail with reference to four specific embodiments.

Embodiment 1

Figure 2:
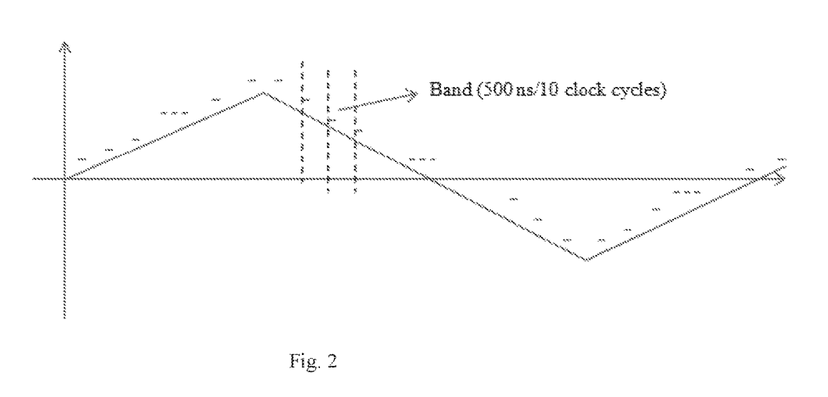
FIG. 2 schematically shows a curve of spread spectrum decoding in a method for reducing EMI of LCD data signal provided in Embodiment 1, in which "Band" stands for a section, 500 ns is considered as one section, and one section is equally divided into 10 clock cycles.
Figure 3:
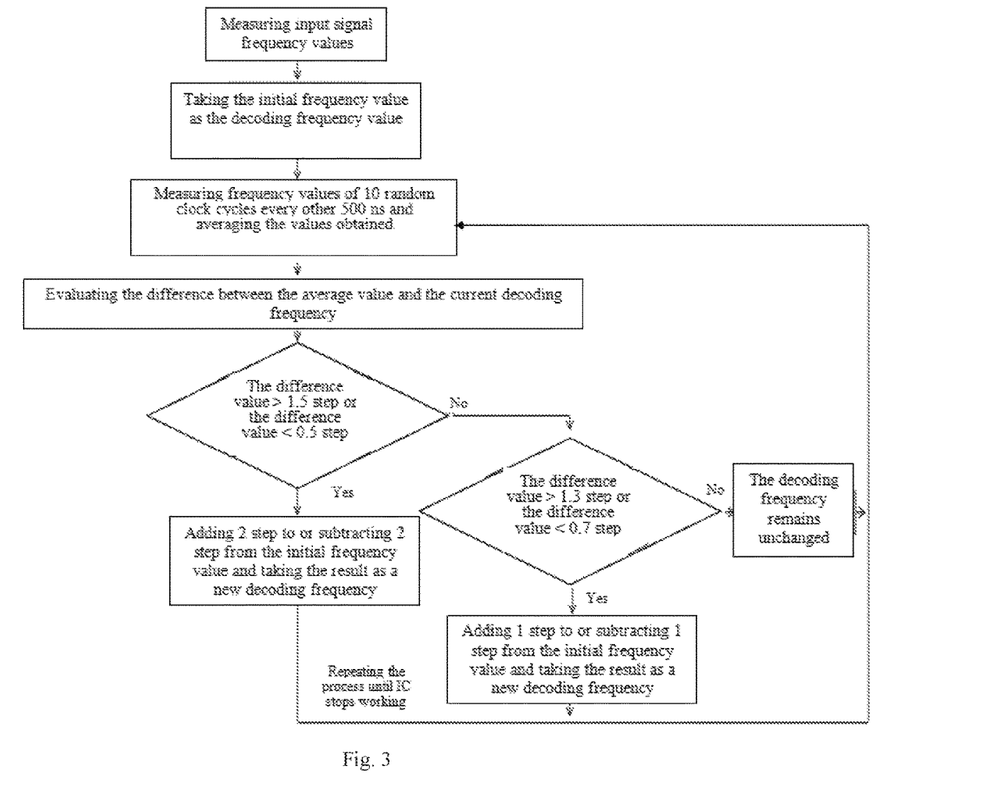
FIG. 3 shows a flow chart of the method for reducing EMI of LCD data signal provided in Embodiment 1.

Embodiment 1 provides a method for reducing EMI of LCD data signal, which will be illustrated in detail with reference to FIG. 2 and FIG. 3.

A color PDP is a display device which has been developing rapidly in recent years. By virtue of excellent performances, a color PDP has become the first choice for large-screen display devices. At present, PDP devices with a large color screen have entered into the market. In particular, AC (Alternating Current)-PDPs have been widely researched and applied due to advantages such as a simple driving method and will gradually be popularized in a few years. As the age of digital TV (television) comes, signal frequencies of a control board of a PDP become higher and higher, which leads to the problem of EMI in a PDP.

Thus, in this embodiment, a HD (high-definition) display device will be taken as an example for illustration. Frequency of a LVDS input signal of a HD display device is 75 MHz (in general, a fixed LVDS input signal frequency of a TFT-LCD is 75 MHz). Variation frequency of spread spectrum modulation is 100 KHz. The variation range of the LVDS input signal frequency is ±2%, i.e. 75 MHz×(±2%)= ±1.5 MHz.

The above values are all listed for exemplification, rather than limiting the parameters.

A TV is powered on and a SOC uses a spread spectrum function to provide an input signal to a TCON, so as to reduce risk of EMI.

The TCON starts to measure frequency of the input signal and the current input signal frequency 75 MHz is taken as an initial decoding frequency value.

The TCON takes 500 ns as one section to measure input signal frequency. With each clock cycle being 13.3 ns, 500 ns can be divided into 37.6 clock cycles. The 37 clock cycles are chosen for measurement.

Input signal frequency values of 10 random cycles in a section are measured and then averaged. An average value avg is obtained. Then a difference value d is obtained by evaluating a difference between the average value avg and the current decoding frequency value. In this embodiment, a unit of the difference value d is MHz.

The foregoing procedures do not define whether the clock cycles measured are successive. Thus, the values obtained are scattered and the steps of obtaining the average value avg of the collected frequencies of these clock cycles and evaluating the difference between the average values avg and the current decoding frequency value are required for adjustment and equalization.

To match the decoding frequency with the input signal frequency, the TCON sets a tracking frequency value. Tracking frequency variation value of each step is b MHz. In this embodiment, b=0.3 MHz. Thus, tracking frequency variation value of 10 steps is 3 MHz which is able to reach the maximum permissible value of input signal frequency variation.

The difference value d MHz is divided by the set tracking frequency value b to obtain a ratio k. A comparison is then made between the ratio k and bp % and between the ratio k and bq %. In this embodiment, p %=150% and q %=50%.

If k>bp %, frequency variation value of two steps is added to the current TCON decoding frequency, i.e., 75 MHz+2 step(0.3 MHz)=75.6 MHz. The result is taken as a new decoding frequency value, so that the decoding frequency can be matched to the current input signal frequency more quickly.

If k<bq %, frequency variation value of two steps is subtracted from the current TCON decoding frequency, i.e. 75 MHz−2 step(0.3 MHz)=74.4 MHz. The result is taken as a new decoding frequency value, so that the decoding frequency can be matched to the current input signal frequency more quickly.

If bq %≤k≤bp %, the following steps are performed.

In this embodiment, r %=70% and s %=130%.

If bs %<k≤bp %, 1 step (tracking frequency variation value of one step) is added to the current decoding frequency, i.e., 75 MHz+1 step(0.3 MHz)=75.3 MHz. The result is taken as a new decoding frequency value, so that the decoding frequency can be matched to the current input signal frequency more quickly.

If bq %≤k<br %, 1 step is subtracted from the current decoding frequency, i.e., 75 MHz−1 step(0.3 MHz)=74.7 MHz. The result is taken as a new decoding frequency value, so that the decoding frequency can be matched to the current input signal frequency more quickly.

If br %≤k≤bs %, i.e., when the above conditions for adding or subtracting 1 step are not met, the current decoding frequency remains unchanged.

Input signal frequency values are continuously measured. The foregoing process is repeated again and again. The decoding frequency is continuously renewed and matched, and the TCON continuously measures and judges the input signal frequency, so as to ensure that the TCON decoding frequency is always matched with the input signal frequency measured, i.e., the input signal is correctly decoded. Only by way of this, can an image be displayed normally.

The foregoing p %, q %, r %, and s % each stand for a set frequency variation rate and the values of q %, s %, r %, and p % are determined in a following way.

Normally, LVDS used in a TFT-LCD has a fixed input signal frequency of 75 MHz. A maximum floating range (variation range) of the input signal frequency is ±2% (75 MHz×(±2%)=±1.5 MHz), while the spread spectrum has a frequency of 200 KHz, i.e., varying in a maximum range of 73.5 MHz to 76.5 MHz.

In this embodiment, a large range of frequency variation is firstly determined, i.e., p %=150/o and q %=50%. In this step, the range of the middle part is enlarged, and thus the range of parts except the middle part, i.e., the range of both ends, is narrowed. By way of this, a range of the decoding frequency value is preliminarily determined. As mentioned in this embodiment, the detailed solution is as below.

If k>bp %, frequency variation value of two steps is added to the current TCON decoding frequency, i.e., 75 MHz+2 step(0.3 MHz)=75.6 MHz. The result is taken as a new decoding frequency value.

If k<bq %, frequency variation value of two steps is subtracted from the current TCON decoding frequency, i.e., 75 MHz−2 step(0.3 MHz)=74.4 MHz. The result is taken as a new decoding frequency value.

The foregoing steps firstly determine edge values. If the ratio k meets the conditions, a decoding frequency value is determined and then decoded. It the ratio k does not meet the two conditions and instead falls in a range of bq %≤k≤bp %, the range needs to be further narrowed.

The specific solution is r %=70% and s %=130%. The decoding frequency value is further determined according to the foregoing principle. First, edge values are determined as above. Since the range of this time is comparatively narrow, if br %≤k≤bs %, a determination can be directly made.

Through the foregoing preliminary and further definition of the range, the TCON decoding frequency is more precise and is matched with the input signal frequency measured. By way of this, difficulties faced by the TCON in continuously measuring and judging the input signal frequency while the power is on is then reduced, the decoding work of the TCON becomes less difficult while EMI is reduced, decoding accuracy is improved, the TCON decoding frequency is matched with the input signal frequency measured, the risk of noise is reduced, and finally a good image quality is ensured.

The method for reducing EMI of LCD data signal provided in this embodiment, while ensuring that decoding frequency bandwidth of a receiving terminal of a TCON remains unchanged, correctly decodes high-speed transmission signals which use a spread spectrum function, which can effectively reduce EMI, avoid noise, quickly and correctly decode high-speed transmission signals which use a spread spectrum function, and enable an image to be displayed normally.

The method for reducing EMI of LCD data signal provided in this embodiment is applicable to decoding of a LCD panel or a LED display panel. Through this method, a normal decoding is realized, EMI is reduced, noise is avoided, and a high image quality is obtained.

Embodiment 2

Figure 4:
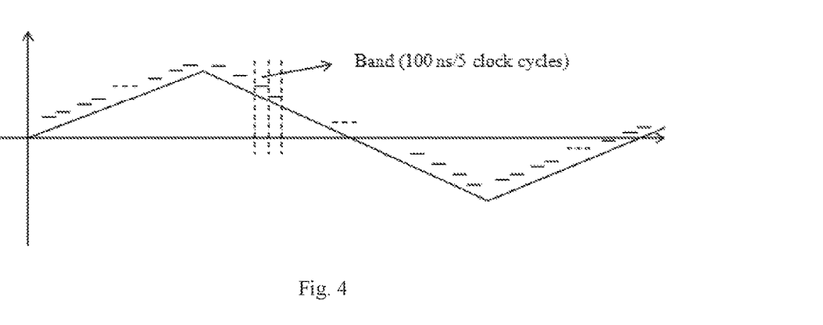
FIG. 4 schematically shows a curve of spread spectrum decoding in a method for reducing EMI of LCD data signal provided in Embodiment 2, in which "Band" stands for a section, 100 ns is considered as one section, and one section is equally divided into 5 clock cycles.
Figure 5:
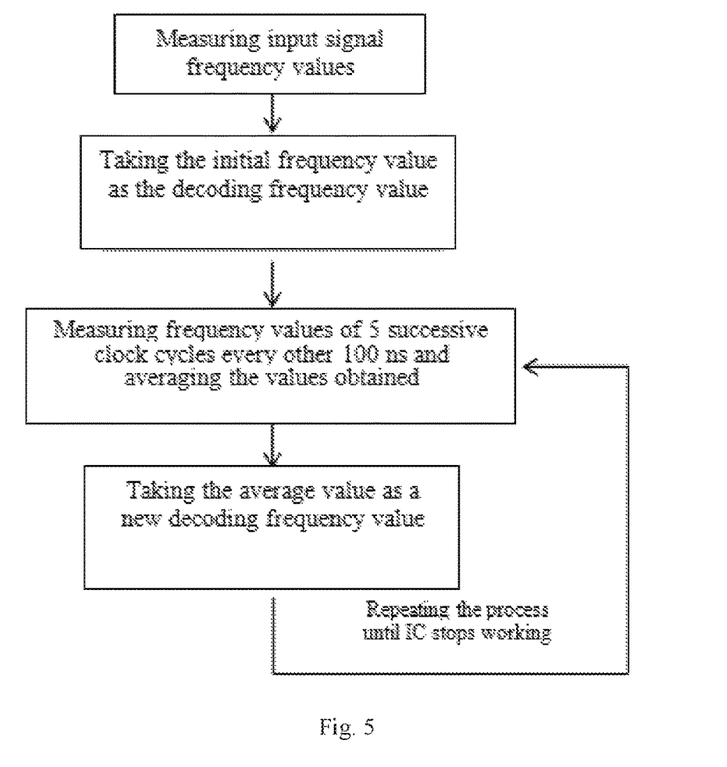
FIG. 5 shows a flow chart of the method for reducing EMI of LCD data signal provided in Embodiment 2.

Embodiment 2 provides a method for reducing EMI of LCD data signal, which will be illustrated in detail with reference to FIG. 4 and FIG. 5.

A color PDP is a display device which has been developing rapidly in recent years. By virtue of excellent performances, a color PDP has become the first choice for large-screen display devices. At present, PDP devices with a large color screen have entered into the market. In particular, AC-PDPs have been widely researched and applied due to advantages such as a simple driving method and will gradually be popularized in a few years. As the age of digital TV comes, signal frequencies of a control board of a PDP become higher and higher, which leads to the problem of EMI in a PDP.

Thus, in this embodiment, a HD display device will be taken as an example for illustration. Frequency of a LVDS input signal of a HD display device is 75 MHz. Variation frequency of spread spectrum modulation is 100 KHz. The variation range of the LVDS input signal frequency is ±2%, i.e. 75 MHz×(±2%)=±1.5 MHz. The above values are all listed for exemplification, rather than limiting the parameters.

A TV is powered on and a SOC uses a spread spectrum function to provide an input signal to a TCON, so as to reduce risk of EMI.

The TCON starts to measure frequency of the input signal and the current input signal frequency 75 MHz is taken as an initial decoding frequency value.

The TCON takes 100 ns as one section to measure input signal frequency. With each clock cycle being 13.3 ns, 100 ns can be divided into 7.5 clock cycles. In actual operation, a shorter time of measuring a section can make the decoding frequency be renewed and matched with the current input signal frequency more quickly and more effectively. However, a shorter measuring time requires a better TCON, which leads to cost pressure.

M is set to be 5, i.e., M=5. Input signal frequency values of 5 successive cycles in a section are measured and then averaged. An average value avg is obtained. Then the average value avg is taken as a new decoding frequency value, so as to be matched with a new input signal frequency value.

The present embodiment is different from Embodiment 1. In Embodiment 1, the decoding frequency value is determined by steps of providing edge values, dividing the range of the decoding frequency according to the edge values, and then determining the final needed decoding frequency value.

The difference between Embodiment 1 and Embodiment 2 is as below. In Embodiment 1, whether the clock cycles measured are successive or not is not defined. Thus, the values obtained are scattered and the steps of obtaining the average value avg of the collected frequencies of the clock cycles and evaluating the difference between the average values avg and the current decoding frequency value are required for adjustment and equalization.

In Embodiment 2, input signal frequency values of successive clock cycles in a section are measured, by way of which the input signal frequency values obtained during this period are uniformly distributed. Thus, the ultimate object of matching a new input signal frequency value with a decoding frequency can be realized through steps of directly obtaining an average value avg of the input frequencies of these clock cycles and taking the average value avg as a new decoding frequency value. Compared with Embodiment 1, Embodiment 2 has a simpler technical solution.

In the foregoing steps, when the input signal frequency becomes smaller, cycles that can be measured in 100 ns become fewer. That is, 5 cycles measured in 100 ns shall not have an input signal frequency below 50 MHz. The more cycles measured in a section, the higher the cost is.

While the power of the TCON is on, input signal frequency values are continuously measured. The foregoing process is repeated again and again. Only when the decoding frequency is continuously renewed and matched, can the TCON correctly decode the input signal, by way of which an image can be displayed normally.

In this embodiment, the average value avg is taken as a new value to be matched with a new input signal frequency value. By way of this, the TCON decoding frequency is more precise and is matched with the measured input signal frequency. By way of this, difficulties faced by the TCON in continuously measuring and judging the input signal frequency while the power is on is then reduced, the decoding work of the TCON becomes less difficult while EMI is reduced, decoding accuracy is improved, the TCON decoding frequency is matched with the measured input signal frequency, the risk of noise is reduced, and finally a good image quality is ensured.

The method for reducing EMI of LCD data signal provided in this embodiment, while ensuring that decoding frequency bandwidth of a receiving terminal of a TCON remains unchanged, correctly decodes high-speed transmission signals which use a spread spectrum function, which can effectively reduce EMI, avoid noise, quickly and correctly decode high-speed transmission signals which use a spread spectrum function, and enable an image to be displayed normally.

The method for reducing EMI of LCD data signal provided in this embodiment is applicable to decoding of a LCD panel or a LED display panel. Through this method, a normal decoding is realized, EMI is reduced, noise is avoided, and a high image quality is obtained.

Embodiment 3

Figure 6:
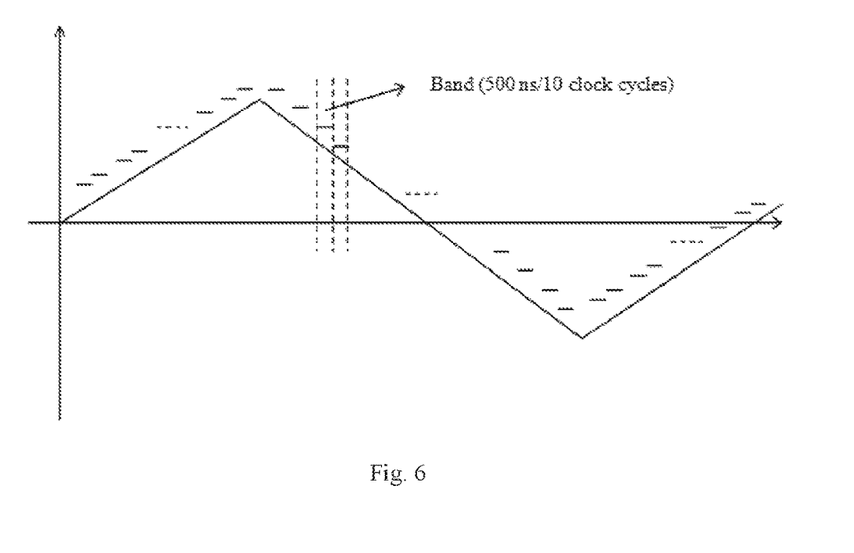
FIG. 6 schematically shows a curve of spread spectrum decoding in a method for reducing EMI of LCD data signal provided in Embodiment 3, in which "Band" stands for a section, 500 ns is considered as one section, and one section is equally divided into 10 clock cycles.
Figure 8:
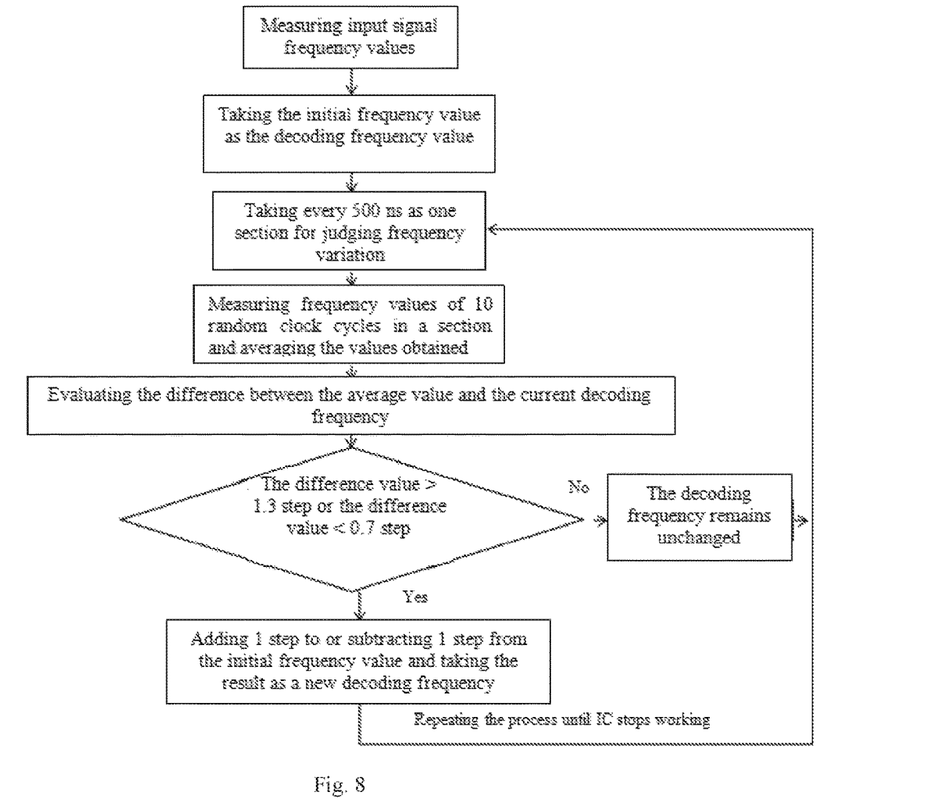
FIG. 8 shows a flow chart of the method for reducing EMI of LCD data signal provided in Embodiment 3.

Embodiment 3 provides a method for reducing EMI of LCD data signal, which will be illustrated in detail with reference to FIG. 6 and FIG. 8.

A color PDP is a display device which has been developing rapidly in recent years. By virtue of excellent performances, a color PDP has become the first choice for large-screen display devices. At present, PDP devices with a large color screen have entered into the market. In particular, AC-PDPs have been widely researched and applied due to advantages such as a simple driving method and will gradually be popularized in a few years. As the age of digital TV comes, signal frequencies of a control board of a PDP become higher and higher, which leads to the problem of EMI in a PDP.

Thus, in this embodiment, a HD display device will be taken as an example for illustration. Frequency of a LVDS input signal of a HD display device is 75 MHz. Variation frequency of spread spectrum modulation is 100 KHz. The variation range of the LVDS input signal frequency is ±2%, i.e. 75 MHz×(±2%)=±1.5 MHz. The above values are all listed for exemplification, rather than limiting the parameters.

A TV is powered on and a SOC uses a spread spectrum function to provide an input signal to a TCON, so as to reduce risk of EMI.

The TCON starts to measure frequency of the input signal and the current input signal frequency 75 MHz is taken as an initial decoding frequency value.

The TCON takes 500 ns as one section to measure input signal frequency. With each clock cycle being 13.3 ns, 500 ns can be divided into 37.6 clock cycles. The 37 clock cycles are chosen for measurement.

M is set to be 10, i.e., M=10. Input signal frequency values of 10 random cycles in a section are measured and then averaged. An average value avg is obtained. Then a difference value d MHz is obtained by evaluating a difference between the average value avg and the current decoding frequency value.

The foregoing procedures do not define whether the clock cycles measured are successive. Thus, the values obtained are scattered and the steps of obtaining the average value avg of the collected frequencies of these clock cycles and evaluating the difference between the average values avg and the current decoding frequency value are required for adjustment and equalization.

To match the decoding frequency with the input signal frequency value, the TCON sets a tracking frequency value.

Tracking frequency variation value of each step is b MHz. In this embodiment, b=0.3 MHz. Thus, tracking frequency variation value of 10 steps is 3 MHz which is able to reach the maximum permissible value of input signal frequency variation.

The difference value d MHz is divided by the set tracking frequency value b to obtain a ratio k. A comparison is then made between the ratio k and bp % and between the ratio k and bq %. In this embodiment, p %=130% and q %=70%.

If k>bp %, frequency variation value of one step is added to the current TCON decoding frequency, i.e., 75 MHz+1 step(0.3 MHz)=75.3 MHz. The result is taken as a new decoding frequency value, so that the decoding frequency can be matched to the current input signal frequency more quickly.

If k<bq %, frequency variation value of one step is subtracted from the current TCON decoding frequency, i.e., 75 MHz−1 step(0.3 MHz)=74.7 MHz. The result is taken as a new decoding frequency value, so that the decoding frequency can be matched to the current input signal frequency more quickly.

If bq %≤k≤bp %, i.e., when the above conditions for adding or subtracting 1 step are not met, the current decoding frequency remains unchanged.

Signal frequency values are continuously measured. The foregoing process is repeated again and again. Only when the decoding frequency is continuously renewed and matched, can the TCON correctly decode the input signal, by way of which an image can be displayed normally.

In this embodiment, a large range of frequency variation is firstly determined, i.e., p %=130/o and q %=70%. In this step, the range of the middle part is enlarged, and thus the range of parts except the middle part, i.e., the range of both ends, is narrowed. By way of this, a range of the decoding frequency value is preliminarily determined. As mentioned in this embodiment, the detailed solution is as below.

If k>bp %, frequency variation value of one step is added to the current TCON decoding frequency, i.e., 75 MHz+1 step(0.3 MHz)=75.3 MHz. The result is taken as a new decoding frequency value.

If k<bq %, frequency variation value of one step is subtracted from the current TCON decoding frequency, i.e., 75 MHz−1 step(0.3 MHz)=74.7 MHz. The result is taken as a new decoding frequency value.

If bq %≤k≤bp %, a determination can be directly made.

Through the above steps, the TCON decoding frequency is more precise and is matched with the measured input signal frequency. By way of this, difficulties faced by the TCON in continuously measuring and judging the input signal frequency while the power is on is reduced, the decoding work of the TCON becomes less difficult while EMI is reduced, decoding accuracy is improved, the TCON decoding frequency is matched with the measured input signal frequency, the risk of noise is reduced, and finally a good image quality is ensured.

The method for reducing EMI of LCD data signal provided in this embodiment, while ensuring that decoding frequency bandwidth of a receiving terminal of a TCON remains unchanged, correctly decodes high-speed transmission signals which use a spread spectrum function, which can effectively reduce EMI, avoid noise, quickly and correctly decode high-speed transmission signals which use a spread spectrum function, and enable an image to be displayed normally.

The method for reducing EMI of LCD data signal provided in this embodiment is applicable to decoding of a LCD panel or a LED display panel. Through this method, a normal decoding is realized, EMI is reduced, noise is avoided, and a high image quality is obtained.

Embodiment 4

Figure 7:
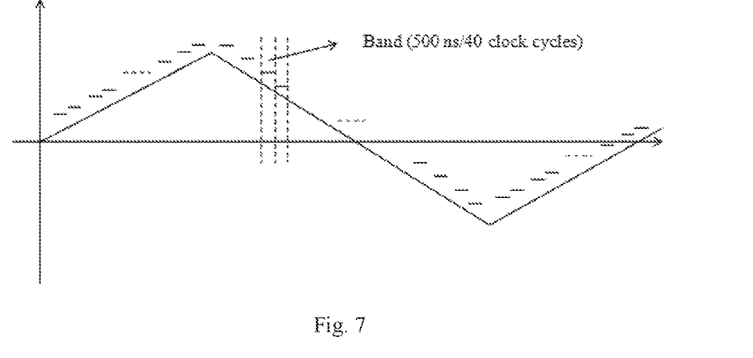
FIG. 7 schematically shows a curve of spread spectrum decoding in a method for reducing EMI of LCD data signal provided in Embodiment 4, in which "Band" stands for a section, 500 ns is considered as one section, and one section is equally divided into 40 clock cycles.
Figure 9:
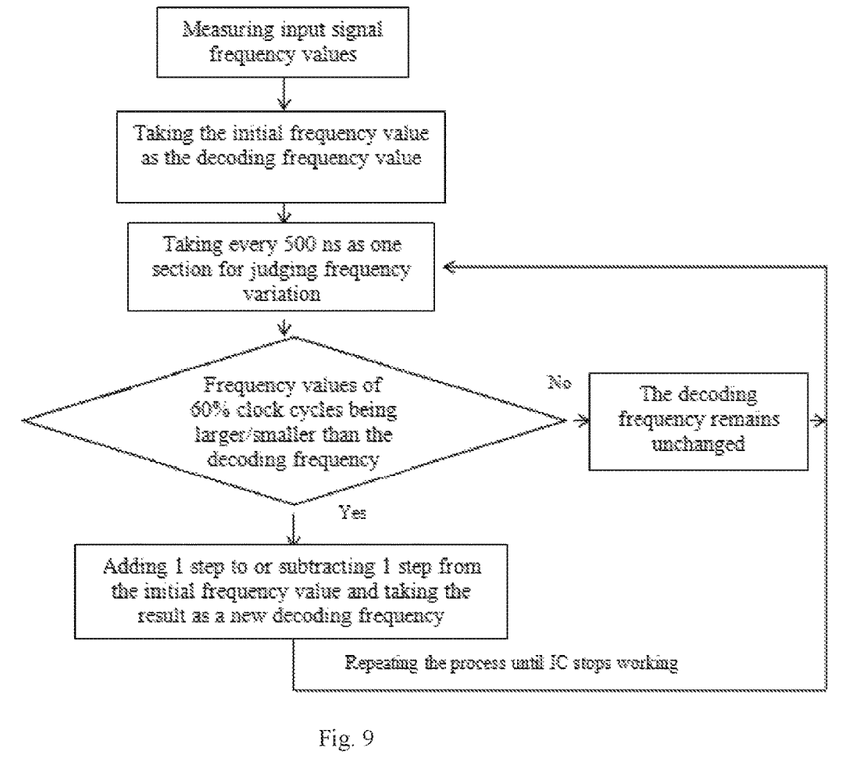
FIG. 9 shows a flow chart of the method for reducing EMI of LCD data signal provided in Embodiment 4.

Embodiment 4 provides a method for reducing EMI of LCD data signal, which will be illustrated in detail with reference to FIG. 7 and FIG. 9.

A color PDP is a display device which has been developing rapidly in recent years. By virtue of excellent performances, a color PDP has become the first choice for large-screen display devices. At present, PDP devices with a large color screen have entered into the market. In particular, AC-PDPs have been widely researched and applied due to advantages such as a simple driving method and will gradually be popularized in a few years. As the age of digital TV comes, signal frequencies of a control board of a PDP become higher and higher, which leads to the problem of EMI in a PDP.

Thus, in this embodiment, a HD display device will be taken as an example for illustration. Frequency of a LVDS input signal of a HD display device is 75 MHz. Variation frequency of spread spectrum modulation is 100 KHz. The variation range of the LVDS input signal frequency is ±2%, i.e., 75 MHz×(±2%)=±1.5 MHz. The above values are all listed for exemplification, rather than limiting the parameters.

A TV is powered on and a SOC uses a spread spectrum function to provide an input signal to a TCON, so as to reduce risk of EMI.

The TCON starts to measure frequency of the input signal and the current input signal frequency 75 MHz is taken as an initial decoding frequency value.

The TCON takes 500 ns as one section to measure input signal frequency. With each clock cycle being 13.3 ns, 500 ns can be divided into 37.6 clock cycles. The 37 clock cycles are chosen for measurement.

Input signal frequency values of 37 cycles in a section are all measured. Each frequency is compared with the decoding frequency and each difference value is recorded. x % is set to be 60%, i.e., x %=60%.

The above step of this embodiment is different from those of the previous three embodiments and the difference is as below.

In the previous three embodiments, input signal frequency values of several clock cycles are measured. However, in this embodiment, all the input signal frequency values in a section are measured, which is aimed to comprehensively obtain distribution of input signal frequency values and obtain specific input signal frequency values. Compared with the previous three embodiments, this embodiment has more simple steps and more precise results.

After input signal frequency values are collected, determination of a new decoding frequency value is made according to the following steps.

If x % of signal frequency values are larger than the current decoding frequency value, i.e., signal frequency values of 600 of cycles (37×60%=22) are larger than the current decoding frequency value, a new decoding frequency value 75 MHz+1 step(0.3 MHz)=75.3 MHz is obtained, and then a decoding is performed by taking advantage of the new decoding frequency value.

If x % of signal frequency values are smaller than the current decoding frequency value, i.e. signal frequency values of 60% of cycles (37×60° o=22) are smaller than the current decoding frequency value, a new decoding frequency value 75 MHz−1 step(0.3 MHz)=74.7 MHz is obtained, and then a decoding is performed by taking advantage of the new decoding frequency value.

If x % of signal frequency values are equal to the current decoding frequency value, i.e., signal frequency values of 60% of cycles (37×60%, =22) are equal to the current decoding frequency value, the current decoding frequency value remains unchanged.

In the above steps, x % is set to be 60%, i.e., be more than a half. By way of this, where most of the decoding frequency values are distributed can be known. Then by way of defining the current decoding frequency value according to the rule of the decoding frequency values, a precise decoding value can be obtained.

Signal frequency values are continuously measured. The foregoing process is repeated again and again. Only when the decoding frequency is continuously renewed and matched, can the TCON correctly decode the input signal, by way of which an image can be displayed normally.

In Embodiment 4, x % stands for a set distribution rate of signal frequency values, i.e., percentage of signal frequency values of each section in total signal frequency values.

In this embodiment, the current decoding frequency value is determined according to the number of signal frequency values. By way of this, difficulties faced by the TCON in continuously measuring and judging the input signal frequency while the power is on is reduced, the decoding work of the TCON becomes less difficult while EMI is reduced, decoding accuracy is improved, the TCON decoding frequency is matched with the measured input signal frequency, the risk of noise is reduced, and finally a good image quality is ensured.

The method for reducing EMI of LCD data signal provided in this embodiment, while ensuring that decoding frequency bandwidth of a receiving terminal of a TCON remains unchanged, correctly decodes high-speed transmission signals which use a spread spectrum function, which can effectively reduce EMI, avoid noise, quickly and correctly decode high-speed transmission signals which use a spread spectrum function, and enable an image to be displayed normally.

The method for reducing EMI of LCD data signal provided in this embodiment is applicable to decoding of a LCD panel or a LED display panel. Through this method, a normal decoding is realized, EMI is reduced, noise is avoided, and a high image quality is obtained.

The present disclosure respectively introduces the practical application of the above four embodiments for reducing EMI of LCD data signal in detail. The present disclosure uses specific embodiments to explain the principle and application of the present disclosure. The above embodiments are only used for helping understanding the method and core concepts of the present disclosure. Those skilled in the art, without departing from the spirit of the present disclosure, can make amendments to the implementing details and the range of application. It should be noted that, the contents disclosed herein shall not be understood as restricting the present disclosure.

The above four embodiments all adopt a self-adaptive spread spectrum solution for decoding. With slight difference in supplement or extension of the judging process, the four embodiments all have a specific technical feature, i.e. a self-adaptive spread spectrum of a SOC signal at the measuring back-end, and are all used for reducing EMI and stabilizing the image quality, which is in conformity with the requirement of unity.

Although the present disclosure is described hereinabove with reference to specific embodiments, it can be understood that, these embodiments are merely examples of the principles and applications of the present disclosure. Hence, it can be understood that, numerous modifications can be made to the embodiments, and other arrangements can be made, as long as they do not go beyond the spirit and scope of the present disclosure as defined by the appended claims. It can be understood that, different dependent claims and features described herein can be combined in a manner different from those described in the initial claims. It can also be understood that, the technical features described in one embodiment can also be used in other embodiments.

The invention claimed is:

1. A method for reducing electromagnetic interference of LCD data signal, comprising:
   dividing a frequency variation cycle of each signal during spread spectrum modulation into N sections; and
   measuring signal frequency values in M successive clock cycles of each section, evaluating an average value of the signal frequency values in M successive clock cycles, and performing a decoding by taking the average value as a new decoding frequency value;
   wherein N and M are positive integers.

2. The method for reducing electromagnetic interference of LCD data signal according to claim 1, wherein after a decoding is performed by taking advantage of the new decoding frequency value, step 2 is repeated to obtain a next new decoding frequency value.

3. A method for reducing electromagnetic interference of LCD data signal, comprising:
   dividing a frequency variation cycle of each signal during spread spectrum modulation into N sections;
   measuring signal frequency values in M random clock cycles of each section, evaluating an average value of the signal frequency values in M random clock cycles, and evaluating a difference between the average value and a current decoding frequency value to obtain a difference value, wherein N and M are positive integers; and
   dividing the difference value by one-step frequency variation value to obtain a ratio, and making a comparison between the ratio and a first predetermined frequency variation value and a comparison between the ratio and a second predetermined frequency variation value:
   if k>bp %, a first new decoding frequency value is obtained, $a_1=a+b$, and then a decoding is performed by taking advantage of the first new decoding frequency value;
   if k<bq %, a second new decoding frequency value is obtained, $a_2=a-b$, and then a decoding is performed by taking advantage of the second new decoding frequency value; and
   if bq %≤k≤bp %, the decoding frequency value maintains the current decoding frequency value, and then a decoding is performed by taking advantage of the current decoding frequency value,
   wherein k represents the ratio, bp % represents the first predetermined frequency variation value, bq % represents the second predetermined frequency variation value, a represents the current decoding frequency value, b represents the one-step frequency variation value, $a_1$ represents the first new decoding frequency value, $a_2$ represents the second new decoding frequency value, and bp %>bq %.

4. The method for reducing electromagnetic interference of LCD data signal according to claim 3, wherein after a decoding is performed by taking advantage of the first new decoding frequency value or the second new decoding frequency value, step 2 and step 3 are repeated to obtain a next new decoding frequency value.

5. A method for reducing electromagnetic interference of LCD data signal, comprising:
dividing a frequency variation cycle of each signal during spread spectrum modulation into N sections, wherein N is a positive integer;
measuring all signal frequency values of each section, making a comparison between all the signal frequency values and a current decoding frequency value, and recording comparison results; and
in the foregoing comparison results,
if x % of the signal frequency values are larger than the current decoding frequency value, a first new decoding frequency value is obtained, $a_1=a+b$, and then a decoding is performed by taking advantage of the first new decoding frequency value;
if x % of the signal frequency values are smaller than the current decoding frequency value, a second new decoding frequency value is obtained, $a_2=a-b$, and then a decoding is performed by taking advantage of the second new decoding frequency value; and
if x % of the signal frequency values are equal to the current decoding frequency value, a decoding is performed by taking advantage of the current decoding frequency value,
wherein x % represents a predetermined distribution rate of signal frequency values, x is a positive number, a represents the current decoding frequency value, b represents one-step frequency variation value, $a_1$ represents the first new decoding frequency value, $a_2$ represents the second new decoding frequency value.

6. The method for reducing electromagnetic interference of LCD data signal according to claim 5, wherein after a decoding is performed by taking advantage of the first new decoding frequency value or the second new decoding frequency value, step 2 and step 3 are repeated to obtain a next new decoding frequency value.

* * * * *